(No Model.)

A. R. AYRES.
COASTING SLED.

No. 507,200. Patented Oct. 24, 1893.

Witnesses.
Wm Kaustein
Fred Kaustein

Inventor.
Albert R. Ayres.

UNITED STATES PATENT OFFICE.

ALBERT R. AYRES, OF HANNIBAL, MISSOURI.

COASTING-SLED.

SPECIFICATION forming part of Letters Patent No. 507,200, dated October 24, 1893.

Application filed March 9, 1893. Serial No. 465,360. (No model.)

*To all whom it may concern:*

Be it known that I, ALBERT R. AYRES, a citizen of the United States, residing at Hannibal, in the county of Marion and State of Missouri, have invented a new and useful Improvement in Coasting-Sleds, of which the following is a specification.

The object of my invention is to provide a roller coasting sled which can be used at all seasons of the year, on any suitable inclined plane, and which can be so readily guided in its course and checked in its motion that it may be used with perfect safety by children as well as adults. I attain this object by the mechanism illustrated in the accompanying drawings.

Figure 1:
Figure 2:
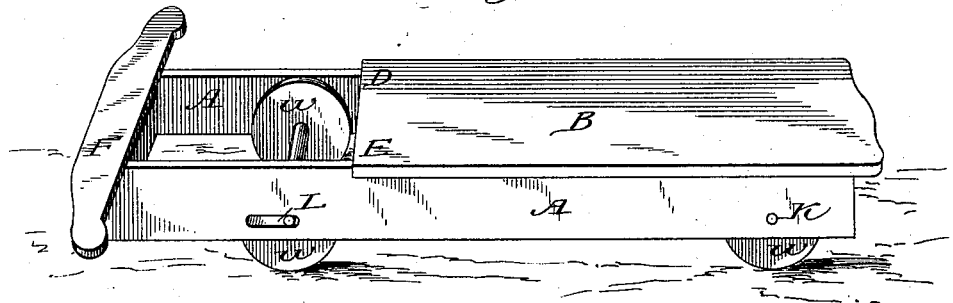

Figure 1 is a plan of the truck with journals J. Fig. 2 is a perspective of the sled, and Fig. 3 is a detail showing brake levers.

The body or frame of the sled is supported by two double trucks, each of which consists of two small wheels $w, w$, (Fig. 1) attached to a shaft of convenient length, in such a manner as to leave one inch, more or less, of each end of the shaft projecting outside of the wheels, respectively. These projections J, J, are the journals upon which, respectively, the parallel side-bars (A, A, Fig. 2,) of the frame rest. One of these trucks is placed near the back end of the frame between the parallel side-bars, and at right angles with them. Its journals are fitted to round or slotted bearings at or near the bottoms of the side-bars respectively (K, Fig. 2). The other truck is placed in the same manner, a short distance forward of the front end of the seat-board B, B. The bearings L, in which its journals revolve are elongated forward one inch, more or less, to allow either end, or both ends of the shaft to be shifted; by which means the course of the sled when in motion may be curved to the right or left. The shifting here referred to, and also the braking or stopping of the wheels, by throwing both forcibly forward, is done by two levers the lower parts of which act upon the wheels or axle. The front end of the seat-board may be used as a fulcrum for these levers, or they may be pivoted at any convenient point where they can be manipulated by the hands or feet of the rider.

F, is a foot-rest which is placed across the side-bars at a convenient distance in front of the seat-board.

Figure 3:
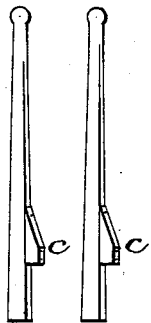

Fig. 3 represents the simplest form of lever to be used.

The check-block C, rests on the front end of the seat-board to prevent the lower end of the lever from striking the ground or floor over which the sled is passing. The rider holds a lever in each hand. The check-blocks rest at D and E respectively, and the lower parts of the levers act upon the wheels or axle in the manner above referred to, thus rendering the sled completely under control of the rider.

I claim as my invention—

A coasting sled comprising side bars A, having slots L, therein, in combination with a truck having projecting journals adapted to slide in the slots L as and for the purpose described.

ALBERT R. AYRES.

Witnesses:
JUDSON ALLEN,
JAMES HALLETT.